G. W. TANNER.
COTTON HARVESTER.
APPLICATION FILED NOV. 12, 1909.

1,007,504.

Patented Oct. 31, 1911.

4 SHEETS—SHEET 1.

G. W. Tanner, Inventor

Witnesses

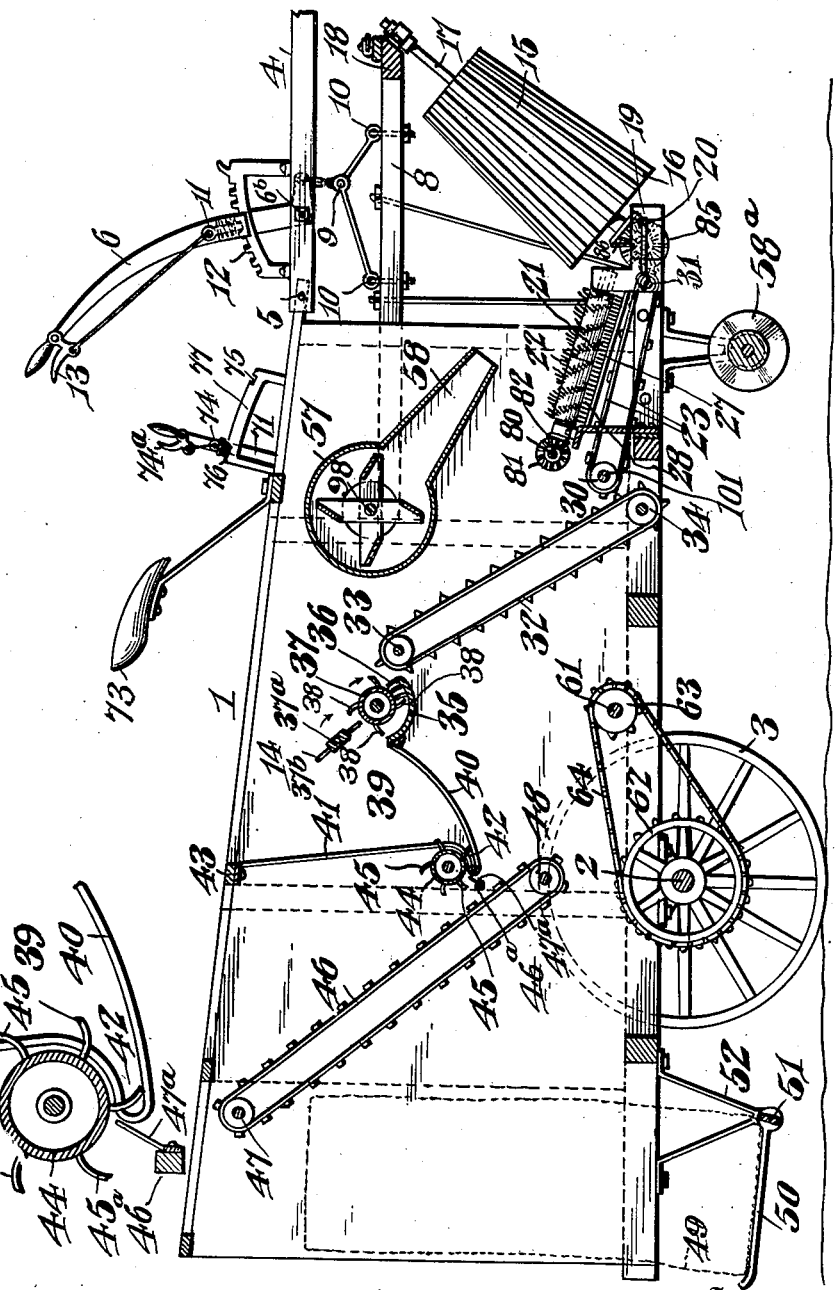

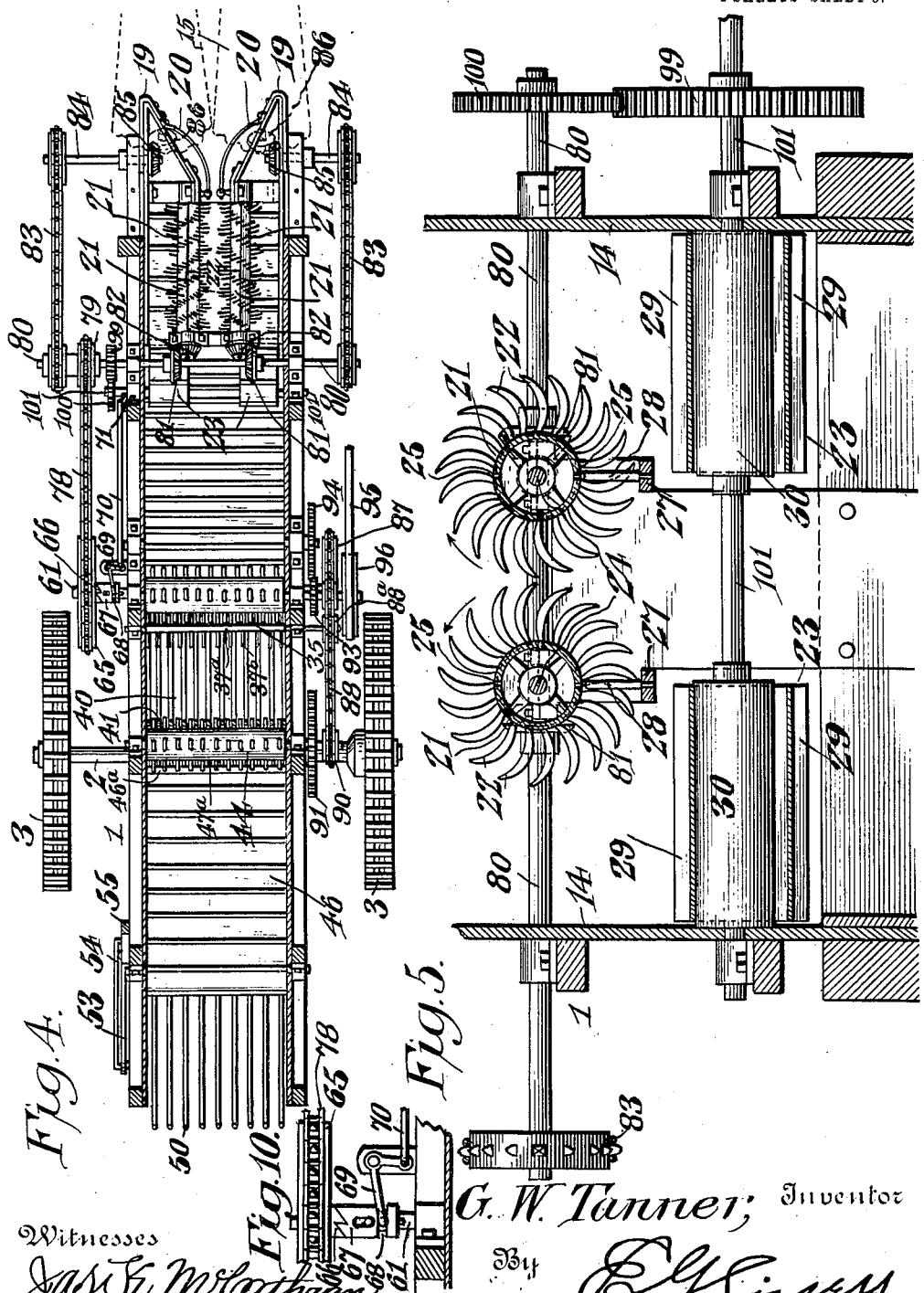

G. W. TANNER.
COTTON HARVESTER.
APPLICATION FILED NOV. 12, 1909.
1,007,504.
Patented Oct. 31, 1911.
4 SHEETS—SHEET 4.
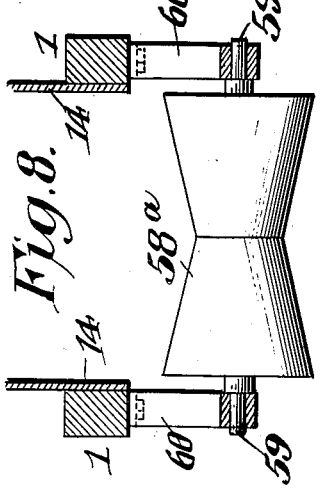
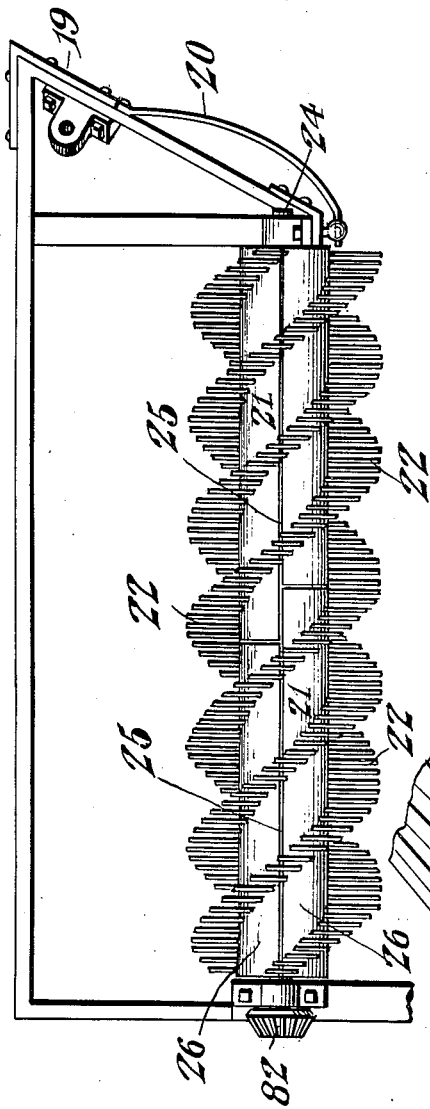
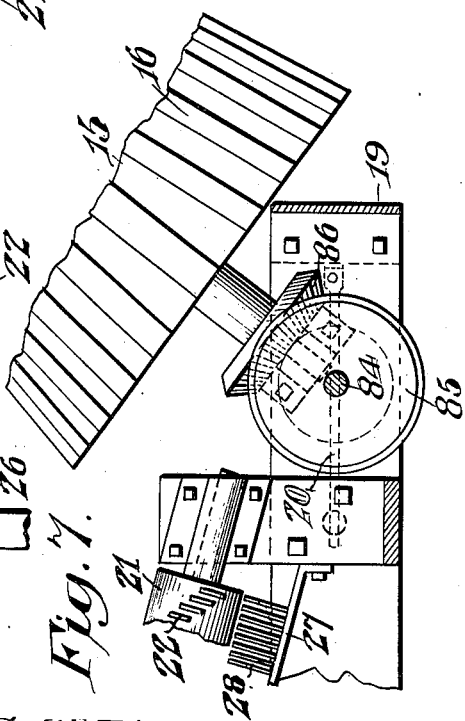
G. W. Tanner, Inventor
Witnesses
By
Attorney

UNITED STATES PATENT OFFICE.

GEORGE W. TANNER, OF CARTERVILLE, ILLINOIS.

COTTON-HARVESTER.

1,007,504.          Specification of Letters Patent.       Patented Oct. 31, 1911.

Application filed November 12, 1909. Serial No. 527,665.

*To all whom it may concern:*

Be it known that I, GEORGE W. TANNER, a citizen of the United States, residing at Carterville, in the county of Williamson and State of Illinois, have invented a new and useful Cotton-Harvester, of which the following is a specification.

The invention relates to improvements in cotton harvesters.

The object of the present invention is to improve the construction of cotton harvesters, and to provide a simple and comparatively inexpensive harvesting machine, adapted to pick the bolls from the plants, crush the former and separate the cotton from the bolls.

Another object of the invention is to provide a cotton harvesting machine, adapted to lessen the expense of harvesting cotton, and capable of enabling the cotton to be picked in a shorter time than heretofore.

A further object of the invention is to effect a saving of the cotton by picking all of the bolls, so that an entire crop of cotton will be picked without loss or waste.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

Figure 1:
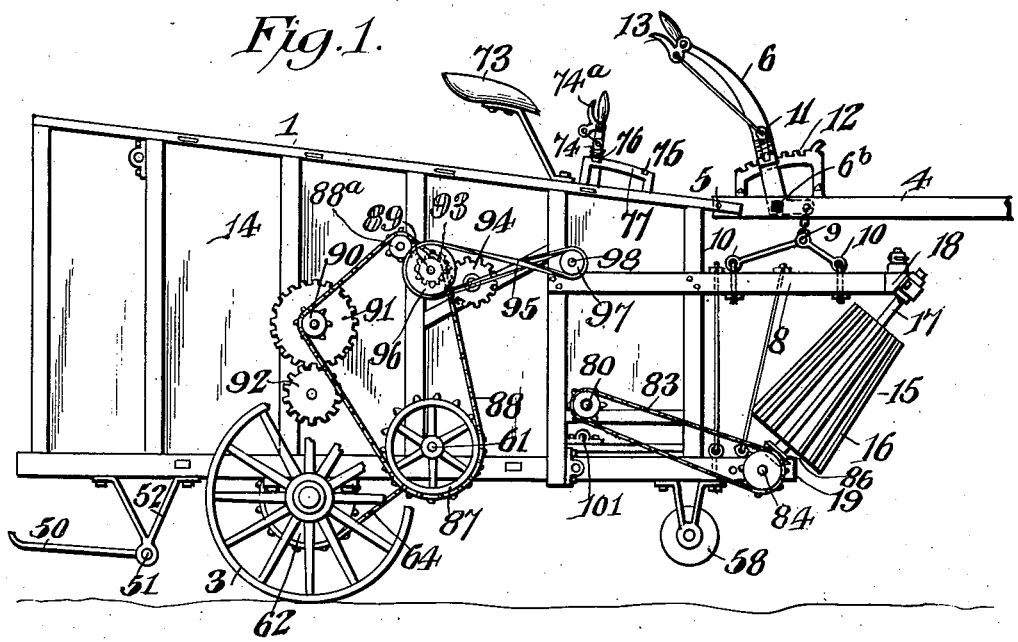
Figure 2:
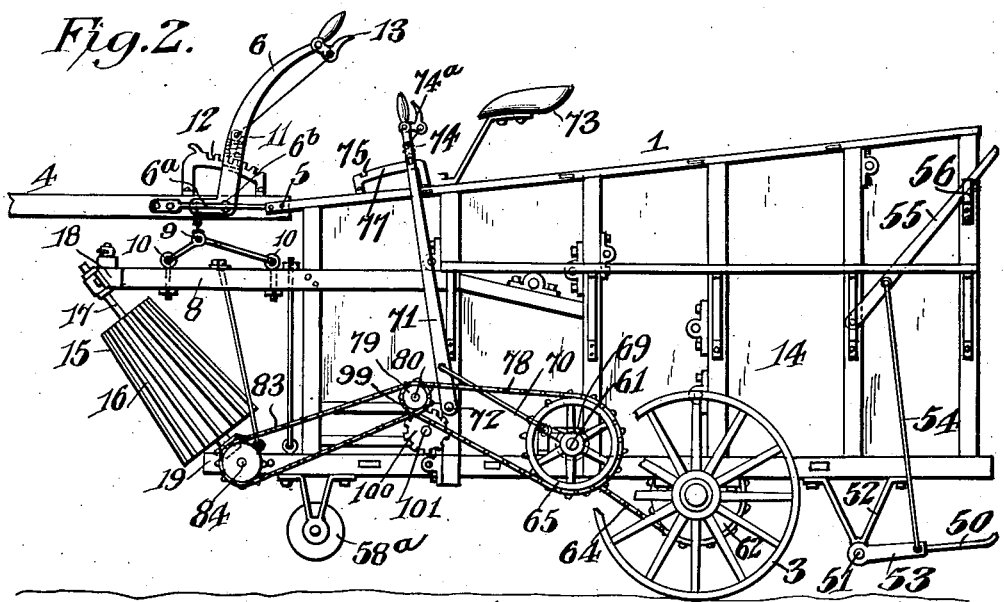

In the drawings:—Figure 1 is a side elevation of a cotton harvester, constructed in accordance with this invention. Fig. 2 is a similar view, showing the opposite side of the machine. Fig. 3 is a central longitudinal sectional view. Fig. 4 is a horizontal sectional view. Fig. 5 is an enlarged transverse sectional view of the picking mechanism. Fig. 6 is a plan view of one of the boll picking cylinders. Fig. 7 is an enlarged detailed sectional view, illustrating a portion of the picking mechanism and the plant lifting mechanism. Fig. 8 is a detail sectional view, illustrating the construction of the ridge roll. Fig. 9 is an enlarged detail sectional view of the separating mechanism. Fig. 10 is an enlarged detail view of the clutch mechanism for throwing the machine into and out of operation.

Like numerals of reference designate corresponding parts in all the figures of the drawings.

In the embodiment of the invention illustrated in the accompanying drawings, the harvesting machine is provided with a frame or casing 1, supported at its rear portion upon a rotary axle 2, which is provided with suitable ground or traction wheels 3, adapted to run in the furrows at the opposite sides of a row of cotton plants. The machine straddles a row of plants, and it is drawn over a field by a team hitched in the ordinary manner to a tongue 4, pivoted at its rear end at 5 to the front of the frame at the top thereof, and adapted to be arranged at different angles with relation to the frame of the machine, whereby the cotton picking mechanism is raised and lowered to position it properly for picking the bolls from the plants. The front of the frame is adjusted by means of a lever 6, arranged in substantially an upright position and fulcrumed at an intermediate point on the tongue by means of a bolt $6^b$, or other suitable fastening device. The lower end of the lever 6 curves forwardly from the pivot or fulcrum bolt $6^b$ and is connected by front and rear links with side bars or beams 8, extending forwardly from the front of the frame at the upper portion thereof and located in a plane below that of the tongue. The links, which extend forwardly and rearwardly from the lower end of the lever, are connected at their adjacent ends by a bolt 9, or other suitable fastening means, and their outer ends are secured to the said bars 8 by means of eye bolts 10, or other suitable fastening devices. The lever, which is arranged in the guide $6^a$ of the tongue, is loosely connected with the outer ends of the links and equipped with a spring actuated dog or detent 11, arranged to engage the teeth of an inclined arcuate ratchet member 12, preferably in the form of a bracket, as shown, and provided with front and rear supporting legs, suitably secured to the upper face of the tongue. The inclined ratchet member extends upwardly and forwardly, and the adjusting lever 6 is adapted to be oscillated backwardly and forwardly to vary the distance between the tongue and the side bars or beams 8. By this means the front of the machine may be raised or lowered to position it properly with relation to the cotton to be picked. The detent 11 is controlled by a ratchet lever 13, located at the upper end of the lever 6 adjacent to the handle or grip portion thereof, so as to be grasped simultaneously with the same. The guide 6ª, which extends longitudinally of the tongue, is located at one side thereof and consists of a rod connected at its terminals with the tongue and offset between its attaching portions to provide a guide opening for the lever.

The frame of the machine, which has spaced side walls 14, may be of any preferred construction, and it is equipped at the front with plant lifting mechanism, consisting of forwardly and upwardly inclined drums or reels 15, tapered upward and corrugated to form longitudinal ribs 16 and intervening grooves. These drums or reels are mounted upon inclined shafts 17, arranged in suitable bearings at opposite sides of the front of the machine, the upper bearings being mounted on a transverse bar 18, which connects the front or outer end of the forwardly projecting side bars 8. The drums or reels are rotated in opposite directions, so that their inner portions, which are located at opposite sides of a row of cotton plants, move upwardly, whereby the drums or reels are adapted to lift the limbs of the cotton plants in order that the same may be effectively operated on by the boll picking mechanism hereinafter described. The lower ends of the inclined shafts 17 are mounted in suitable bearings at the lower portion of the front of the frame.

The front of the frame is provided at the bottom with forwardly projecting tapered portions 19, spaced apart to provide a passage-way for the cotton plants. The spaced projecting portions 19, which are approximately V-shaped, may be constructed of metal, or other suitable material and have longitudinal outer sides and angularly disposed inner sides. The outer sides of the front projecting portions 19 are arranged in flush relation with the sides of the frame of the machine, and the inner sides of the said projecting portions are disposed diagonally thereof and have bowed guide rods 20, mounted on them to direct the cotton plants into the space between rotary boll picking cylinders 21. The rotary boll picking cylinders, which are set at an inclination, are provided with spiral rows of picker teeth or fingers 22, curved from their inner to their outer ends in a direction transversely of the rolls or cylinders 21, and having their side faces in parallelism. The picker teeth are curved downwardly at the inner sides of the cylinders, and move upwardly so as to strip the bolls from the cotton plants, and they deposit the bolls upon inclined endless carriers 23. The cylinders, which are hollow, are mounted on longitudinal shafts 24 and are divided longitudinally at 25, and each half cylinder consists of upper and lower sections, the adjacent ends of the sections of one of the half cylinders being spaced from the adjacent ends of the sections of the co-acting half cylinder to brake joints and thereby assist in maintaining the adjacent ends of the sections in alinement. The upper or rear sections 26 are removable to shorten the boll picking cylinders when harvesting the first crop of cotton. The picker teeth jerk the bolls from the cotton plants, and they are arranged to present their convex edges to the material, as clearly illustrated in Fig. 5 of the drawings. In order to prevent the bolls of cotton from being carried around the cylinders with the teeth, the machine is equipped at opposite sides with longitudinal combs 27, set at an inclination in parallelism with the axis of the shafts of the picking rolls or cylinders and consisting of upwardly extending straight parallel teeth 28, suitably secured at their lower ends to a bar or member and spaced apart to permit the picker teeth to pass between them, whereby the bolls will be positively stripped from the picking cylinders or rolls. The curvature of the teeth and their particular arrangement on the cylinders or rolls enable the teeth to be readily withdrawn from the material in passing through the said combs. The bar or member to which the teeth 28 are secured, constitutes the back of the comb and is suitably secured to the frame of the machine. The combs are preferably located below the cylinders and are arranged above the inner longitudinal edges of the front endless carriers 23.

The front endless carriers 23, which are arranged in spaced relation at opposite sides of the passage-way for the plants, consist of belts of canvas provided with transverse bars or slats 29, and arranged on upper and lower rolls 30 and 31. The front endless carriers convey the cotton bolls rearwardly and deposit them upon an inclined intermediate endless carrier 32, located in rear of the boll picking mechanism and extending therefrom to a point in advance of the mechanism for crushing the bolls. The intermediate endless carrier 32 is constructed similar to the front carriers and consists of a canvas belt, provided at intervals with slats and arranged on upper and lower transverse rolls 33 and 34. The crushing mechanism comprises a lower or bottom concave 35, having fixed teeth 36 and a rotary cylinder 37, provided with teeth 38. The concave 35 is suitably mounted between the sides of the frame of the machine, and the teeth 36 thereof are arranged at regular intervals to provide spaces for the passage of the teeth 38, which in passing between the fixed teeth break and crush the cotton bolls and free the cotton therefrom.

The teeth 38 of the rotary cylinder 37 of the crushing mechanism are cleaned by a rotary brush 37ª, consisting preferably of a bar or member provided at its side edges with spaced wires 37ᵇ. The bar or member is journaled in suitable bearings in the sides of the frame of the machine, and it is rotated in the same direction as the crushing cylinder by the gearing hereinafter described. The rotation of the brush 37ª positively removes the crushed bolls and the cotton from the crushing cylinder and prevents the material from being carried around by the cylinder.

The crushed bolls and the cotton are delivered by the crushing mechanism into a separating hopper 39, tapered downwardly and composed of an inclined front portion 40 and a slightly inclined rear portion 41. The front and rear portions are formed by spaced rods, arranged in parallelism and bent in the form shown in Fig. 3. The front portions of the rods are slightly curved, and the rear portions are straight to within a short distance of the lower ends of the front portions, where the rods are curved rearwardly to provide a rearwardly tapering constricted pocket 42. The front ends of the rods are secured to the concave of the crushing mechanism at the rear edge thereof, and the other ends of the rods are attached to a transverse bar 43, extending across the frame at the top thereof.

The cotton is operated on at the bottom of the hopper 39 by a separating roll or cylinder 44, provided with projecting teeth 45, operating in the space between the rods of the hopper 39 and adapted to throw the bolls downward from the hopper and at the same time carry the cotton from the hopper and deposit the separated cotton upon a rear inclined endless carrier 46. The separated cotton as it leaves the hopper 39 is operated on by a transversely disposed comb 46ª, consisting of a horizontal bar or member secured at its terminals to the frame of the machine at a point below the separating roll or cylinder, and equipped at its front with upwardly and forwardly extending inclined teeth 47ª of wire or other suitable material. The comb assists in cleaning the cotton, and it prevents the crushed bolls from being thrown upon the rear end of the carrier by the separating roll or cylinder 44. The rear inclined endless carrier is constructed similar to the intermediate endless carrier and consists of a canvas belt, provided at intervals with slats and arranged upon upper and lower rolls 47 and 48.

A bag or sack 49 is supported at the rear portion of the machine beneath the upper end of the rear endless carrier and is adapted to receive the cotton therefrom, which is delivered by the machine in condition for the market. The sack 49 is supported upon a pivoted holder 50, consisting of a transverse series of rods extending from a shaft or pintle 51, which is journaled in suitable bearings of supporting brackets 52. The shaft or pintle is provided at one end with an arm 53, which is connected by a rod 54 with an operating lever 55, located at one side of the frame of the machine and held in an upwardly inclined position by a fixed catch or support 56 to maintain the sack holder in substantially a horizontal position. After a sack has been filled with cotton and it is desired to remove the same from the machine, the holder is dropped to the ground by disengaging the lever 55 from the catch or support 56 and swinging the former downward.

The machine is equipped at its front portion with an interiorly arranged fan 57, having a tubular elongated discharge mouth 58, arranged at an inclination and located above the boll picking mechanism, and extending downwardly in the direction of the corrugated drums or reels, and adapted to blow the leaves and similar trash out of the machine to prevent such leaves and branches from being carried inward by the mechanism of the harvester.

In order to prevent the plants from being pulled up by the roots and carried into the machine by the picking mechanism in harvesting cotton after the plants have been killed by frost, the machine is provided at a point beneath the picking mechanism with a transverse roll 58ª, oppositely tapered from the ends to the center and arranged to run along the ridge, and adapted to hold the plants against the ridge while the bolls are being stripped from the former. The tapered roll is provided with a shaft 59, journaled in suitable bearings in brackets 60, secured to and depending from opposite sides of the frame of the machine, as clearly illustrated in Fig. 8 of the drawings. When the front of the machine is dropped to lower the transverse roll 58ª, the rear portion of the machine will be elevated, which will raise the sack holder a considerable distance above the ridge operated on by the roll.

Motion is communicated from the axle at a transverse clutch shaft 61 by sprocket gearing located within the frame of the machine and consisting of a sprocket wheel 62, keyed or otherwise secured to the axle, a sprocket pinion 63 suitably fixed to the clutch shaft and a sprocket chain 64, arranged on and meshing with the sprocket wheel and the sprocket pinion. Loose on one end of the clutch shaft is a sprocket wheel 65, having a clutch face 66 at its inner side to operate with a movable clutch section 67, slidably interlocked with the shaft 61 and adapted to be moved into and out of engagement with the clutch face of the sprocket wheel 65 to throw the machine into and out of operation. The slidable clutch section 67 is provided with an annular groove 68, which is engaged by one arm of a bell crank lever 69, mounted on a suitable support and connected by a link rod 70 with an operating lever 71. The operating lever, which is fulcrumed at its lower end 72, is located at one side of the frame of the machine and extends above the same, being located in advance of a seat 73, provided for the accommodation of the driver. The operating lever 71 is equipped at its upper end with a spring actuated detent 74, adapted to engage front and rear notches 75 and 76 of a ratchet bracket 77 for locking the lever in either of its positions. The detent is controlled by a latch lever 74ª mounted on the clutch operating lever 71 adjacent to the upper handle end thereof. The operating lever when thrown rearward to the position illustrated in Figs. 1 and 2 of the drawings actuates the bell crank lever 69 and throws the movable section of the clutch into engagement with the clutch face of the sprocket wheel. This causes the sprocket wheel 65 and the gearing hereinafter described to be operated when the machine moves forward. The sprocket wheel 65 is connected by a sprocket chain 78 with a sprocket pinion 79 of a transverse shaft 80, extending across the frame of the machine at the front portion thereof, and equipped at opposite sides of the center with bevel gears 81, meshing with corresponding bevel gears 82, fixed to the rear ends of the shafts of the boll picking cylinders, whereby rotary motion will be communicated to the same. The front transverse shaft 80 is also connected at its ends by sprocket gearing 83 with short front transverse shafts 84, and the latter have mounted thereon at their inner ends bevel gears 85, which mesh with bevel gears 86, suitably secured to the lower ends of the shafts 17 of the plant lifting drums or reels 15.

A sprocket wheel 87 is fixed to the transverse clutch shaft at the side of the machine opposite that at which the loose pulley is arranged, and the said wheel 87 is connected by a sprocket chain 88 with sprocket pinions 89 and 90, mounted, respectively, on the shafts of the crushing cylinder 37 and the separator cylinder 44. This arrangement of the gearing rotates the separator cylinder in the direction of the arrow in Fig. 9 of the drawings, and the convex sides of the teeth 45 are presented to the cotton within the hopper 39. The sprocket chain 88 is also arranged on a sprocket pinion 88ª of the brush 37ª, whereby rotary motion is communicated to the latter. Motion is communicated from the shaft of the separator cylinder to the lower roll of the rear inclined endless carrier 46 by gear wheels 91 and 92, and gear wheels 93 and 94 communicate motion from the shaft of the crushing cylinder to the upper roll of the intermediate inclined endless carrier 32. The fan is driven by a crossed belt 95 and pulleys 96 and 97, mounted, respectively, on the shaft of the crushing cylinder and the fan shaft 98. The front endless carriers, which receive the bolls from the picking cylinders, are driven by spur gears 99 and 100, mounted, respectively, on the front transverse shaft 80 and on the shaft 101, which connects the upper rolls 30 of the front endless carriers.

Having thus fully described my invention, what I claim as new and desire to secure by Letters Patent, is:—

1. A cotton harvesting machine including spaced inclined plant lifting rolls located at the front of the machine and having contiguous co-acting plant gripping faces arranged to clamp the branches of the plants between them, means for causing the contiguous faces of the rolls to move upwardly for lifting the branches of the cotton plants, and boll picking mechanism located in rear of the rolls and provided with means for stripping the bolls from the cotton plants.

2. A cotton harvesting machine including spaced plant lifting rolls located at the front of the machine and extending upwardly and forwardly and provided with contiguous plant gripping faces arranged to clamp the branches of the plants between them, means for causing the contiguous faces of the rolls to move upwardly to lift the branches of the plants, boll picking cylinders provided with teeth and located in rear of the said rolls and inclined upwardly and rearwardly, and means for causing the inner adjacent portions of the cylinders to move upwardly to strip the bolls from the cotton plants.

3. A cotton harvesting machine including spaced inclined plant lifting rolls located at the front of the machine and extending forwardly and upwardly and arranged to grip and clamp the cotton plants between them, means for causing the contiguous faces of the rolls to move upwardly to lift the branches of the cotton plants, and boll picking mechanism located in rear of the lower ends of the rolls and inclined upwardly and rearwardly.

4. A cotton harvesting machine including spaced rolls having straight longitudinal corrugations and located at the front of the machine and provided with contiguous plant gripping faces arranged to clamp the plants between them, means for causing the contiguous faces of the rolls to move upwardly to lift the branches of the cotton plants, and means located in rear of the rolls for stripping the bolls from the cotton plants.

5. A cotton harvesting machine including plant lifting rolls arranged at the front of the machine and provided with longitudinal ribs and intervening grooves forming plant gripping faces arranged to clamp the plants between them, means for causing the contiguous faces of the rolls to move upwardly to lift the branches of the cotton plants, and cotton picking mechanism located in rear of the rolls.

6. A cotton harvesting machine including front plant lifting rolls set at an inclination and extending upwardly and forwardly and tapered toward their front ends and having contiguous co-acting portions arranged to grip and clamp the cotton plants between them, means for causing the contiguous faces of the rolls to move upwardly to lift the branches of the cotton plants, and cotton picking mechanism located in rear of the said rolls.

7. A cotton harvesting machine including inclined plant lifting rolls arranged at the front of the machine and extending upwardly and forwardly and tapered toward their front ends and provided with straight longitudinal ribs and intervening grooves arranged to clamp the cotton plants, means for causing the contiguous faces of the rolls to move upwardly for lifting the branches of the cotton plants, and cotton picking mechanism located in rear of the rolls.

8. A cotton harvesting machine including a boll picking cylinder provided with teeth arranged in a plurality of continuous spiral rows extending from one end of the cylinder to the other, the spiral rows being spaced from one another and arranged in substantial parallelism, and the teeth of the spiral rows being sufficiently close to each other to strip the bolls from the cotton plants, said teeth being set in transverse planes and curved transversely of the machine.

9. A cotton harvesting machine including a boll picking cylinder arranged at an inclination and having a spiral row of teeth extending around the cylinder, said teeth being set in transverse planes and arranged sufficiently close to each other to strip the bolls from the cotton plants, and a straight comb extending longitudinally of the cylinder and located below the same in substantially the central vertical plane of the said cylinder, the spiral teeth of the cylinder being arranged to pass between the teeth of the comb, whereby the bolls are positively stripped from the cylinder.

10. A cotton harvesting machine including a boll picking cylinder provided with teeth, conveying means located below and disposed longitudinally of the cylinder and extending beneath the same to substantially the vertical plane through the axis thereof and arranged to receive the bolls, and a comb located centrally and longitudinally beneath the cylinder and arranged above and along the adjacent side of the conveying means and having spaced vertical teeth through which the teeth of the cylinder pass, whereby the bolls are positively stripped from the cylinder and are caused to fall upon the conveying means.

11. A cotton harvesting machine including a boll picking cylinder having projecting teeth, said cylinder being split longitudinally and divided transversely to form removable sections.

12. A cotton harvesting machine including boll picking mechanism extending substantially longitudinally of the machine, and a fan located above the boll picking mechanism and having its mouth or outlet opening toward the front of the machine to blow the loose leaves and trash forwardly out through the front of the machine.

13. A cotton harvesting machine including boll picking cylinders extending substantially longitudinally of the machine, and a fan located above the boll picking cylinders and having its mouth opening toward the front of the machine and in position for blowing the loose leaves and the trash forwardly out of the front of the machine.

14. A cotton harvesting machine including boll picking cylinders extending substantially longitudinally of the machine, and a fan located above the boll picking cylinders and having an elongated nozzle extending downwardly and forwardly over the cylinders and arranged at an inclination to blow the leaves and trash forwardly out of the front of the machine.

15. A cotton harvesting machine including boll stripping means, and a roll located directly below the boll stripping means and oppositely tapered from its ends to its center and arranged to run on the ridge to hold the plants against the same while they are being operated on by the boll stripping mechanism to prevent the plants from being drawn into the machine.

16. A cotton harvesting machine including boll stripping means located at the front of the machine for picking the bolls from the plants while the latter are left standing, boll crushing mechanism, conveying means extending from the picking means to the boll crushing mechanism, and separate mechanism arranged to receive the crushed bolls and cotton from the crushing mechanism and provided with means for separating the cotton from the bolls.

17. A cotton harvesting machine including means located at the front of the machine for picking the bolls from the plants while the latter are left standing, mechanism for crushing the bolls comprising a fixed concave having teeth, and a rotary toothed cylinder, conveying means extending from the picking means to the crushing means, and separate mechanism arranged to receive the crushed bolls and cotton from the crushing mechanism and provided with means for separating the cotton from the crushed bolls.

18. A cotton harvesting machine including boll stripping means located at the front of the machine for picking the bolls from the plants while the latter are left standing, means for crushing the bolls, conveying means extending from the picking means to the crushing means, and separate mechanism arranged to receive the material from the crushing means for separating the cotton from the crushed bolls and comprising a hopper having openings, and a rotary element arranged exteriorly of the hopper and having projecting members extending through the openings of the hopper.

19. A cotton harvesting machine including boll stripping means located at the front of the machine for picking the bolls from the plants while the latter are left standing, means for crushing the bolls, conveying means extending from the picking means to the crushing means, and separate mechanism arranged to receive the material from the crushing means for separating the cotton from the crushed bolls and comprising a hopper composed of spaced rods forming intervening openings, and a separator cylinder mounted exteriorly of the hopper and having teeth extending between the rods.

20. A cotton harvesting machine including boll stripping means located at the front of the machine for picking the bolls from the plants while the latter are left standing, mechanism for crushing the bolls, conveying mechanism extending from the picking means to the crushing mechanism, separate means arranged to receive the material from the crushing mechanism for separating the cotton from the crushed bolls, a carrier for conveying away the separated cotton, and means for supporting a sack in position to receive the cotton.

21. A cotton harvesting machine including a pivoted sack holder, and an operating lever connected with the sack holder for oscillating the same.

22. A cotton harvesting machine including a sack holder comprising a transverse pintle rod, spaced arms extending from the pintle rod, an adjusting lever, and means for connecting the sack holder with the adjusting lever.

23. A cotton harvesting machine including means located at the front of the machine for picking the bolls from the plants while the latter are left standing, a rotary crushing cylinder provided with teeth, a concave having fixed teeth coöperating with the cylinder, a rotary brush arranged to remove the material from the teeth of the cylinder, conveying means extending from the picking means to the said concave, and separate mechanism arranged to receive the crushed bolls and cotton from the crushing cylinder and provided with means for separating the cotton from the crushed bolls.

24. A cotton harvesting machine including picking mechanism, crushing mechanism provided with a rotary toothed crushing roll, separate mechanism located in rear of the crushing mechanism and having a hopper to receive the crushed bolls and cotton, and a rotary brush arranged to remove the material from the teeth of the crushing roll for causing the same to be deposited in the said hopper, and means for conveying the picked material to the crushing mechanism.

25. A cotton harvesting machine comprising a frame provided at opposite sides of its front end with rigid forwardly extending bars, wheels supporting the rear portions of the frame, inclined plant lifting rolls located at the front of the machine and extending upwardly and forwardly and supported at their upper ends by the said forwardly extending bars, a tongue pivotally connected to the front of the frame at the top thereof above the plane of the said bars, a lever fulcrumed on the tongue, and means for connecting the lever with the forwardly extending bars.

In testimony, that I claim the foregoing as my own, I have hereto affixed by signature in the presence of two witnesses.

GEORGE W. TANNER.

Witnesses:
J. W. NELSON,
G. W. SPICES.